Figure 1:
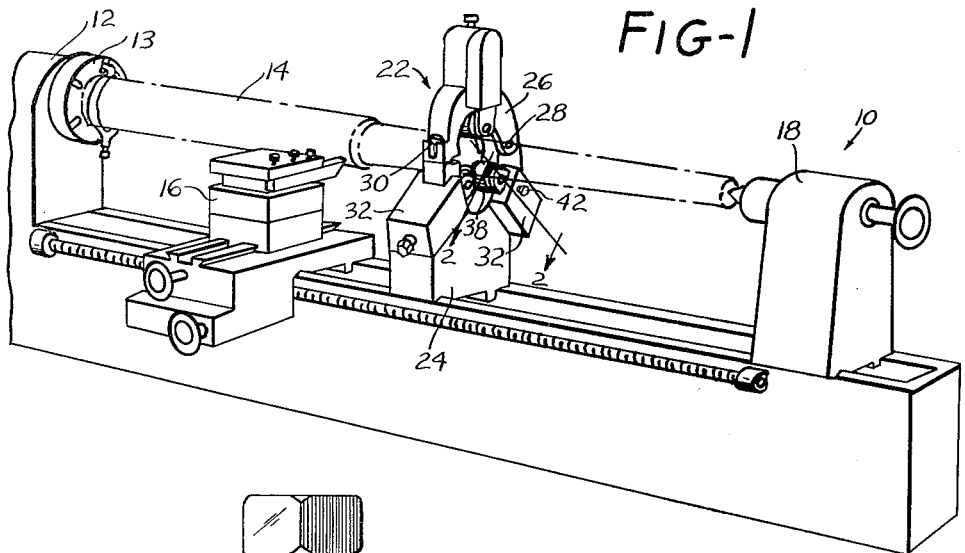

Dec. 28, 1965   O. HERMANN   3,225,631

SELF-ADJUSTING STEADY REST ROLLER

Filed Nov. 22, 1963

INVENTOR.
OTTO HERMANN
BY Toulmin & Toulmin

ATTORNEYS

United States Patent Office 3,225,631
Patented Dec. 28, 1965

3,225,631
SELF-ADJUSTING STEADY REST ROLLER
Otto Hermann, Cincinnati, Ohio, assignor to The R. K. Le Blond Machine Tool Co., Cincinnati, Ohio, a corporation of Delaware
Filed Nov. 22, 1963, Ser. No. 325,612
8 Claims. (Cl. 82—39)

This invention relates to machine tools and is particularly concerned with an improved steady or follow rest arrangement for machine tools and is most especially concerned with a self-adjusting roller unit for use in such rests.

Steady or follow rests are often employed in connection with machine tools to support a workpiece against deflection or vibration while being machined. Heretofore such steady rests have generally employed rollers alone or in combination with sliding shoe supports to give the workpiece the proper stability during machining.

Many times it occurs, however, that the region of the workpiece which is engaged by the steady rest is slightly tapered and the usual steady rest roller arrangement cannot compensate for any taper in the workpiece but will engage the workpiece at one of the two side edges of the roller. Engagement of the workpiece in the described manner not only can load the bearing of the steady rest roller beyond allowable limits so that the bearing will deteriorate rapidly, but the roller itself becomes worn unevenly from side to side and, furthermore, the workpiece may be deformed or damaged by the high stress existing between it and the roller. It will be understood that many times the steady rest structure is subjected to relatively heavy loading when a heavy cut is taken on the workpiece and it is necessary to use high forces to prevent deflection or vibration of the workpiece.

With the foregoing in mind, a primary objective to the present invention is a provision of an improved steady or follow rest for machine tools in which the drawbacks of steady rest arrangements according to the prior art as described above are avoided.

A still further object of this invention is the provision of a roller structure for use in a steady rest frame in which the roller is so arranged that it will automatically adjust itself to a tapered surface on the workpiece.

Still another object of this invention is the provision of a steady rest roller and a supporting jaw therefor that can be placed in a conventional steady rest frame and which will provide adequate support for not only straight work pieces but also for work pieces which are slightly tapered at the point of engagement thereof by the steady rest roller.

Still a further object of the present invention is the provision of a steady rest roller arrangement that will adjust itself to the contour of the work piece engaged thereby whereby mounting of the supporting frame for the steady rest rollers is less critical than has been the case heretofore thus leading to a more inexpensive construction of the steady rest than has been possible prior to this time.

Still another object is the provision of a self-adjusting steady rest roller arrangement in which the roller and supporting jaw therefor are relatively simple to construct and which will readily operate under all normal conditions to which steady rest rollers are subjected and which will also operate satisfactorily when the work piece engaged by the steady rest roller is slightly tapered.

Figure 2:
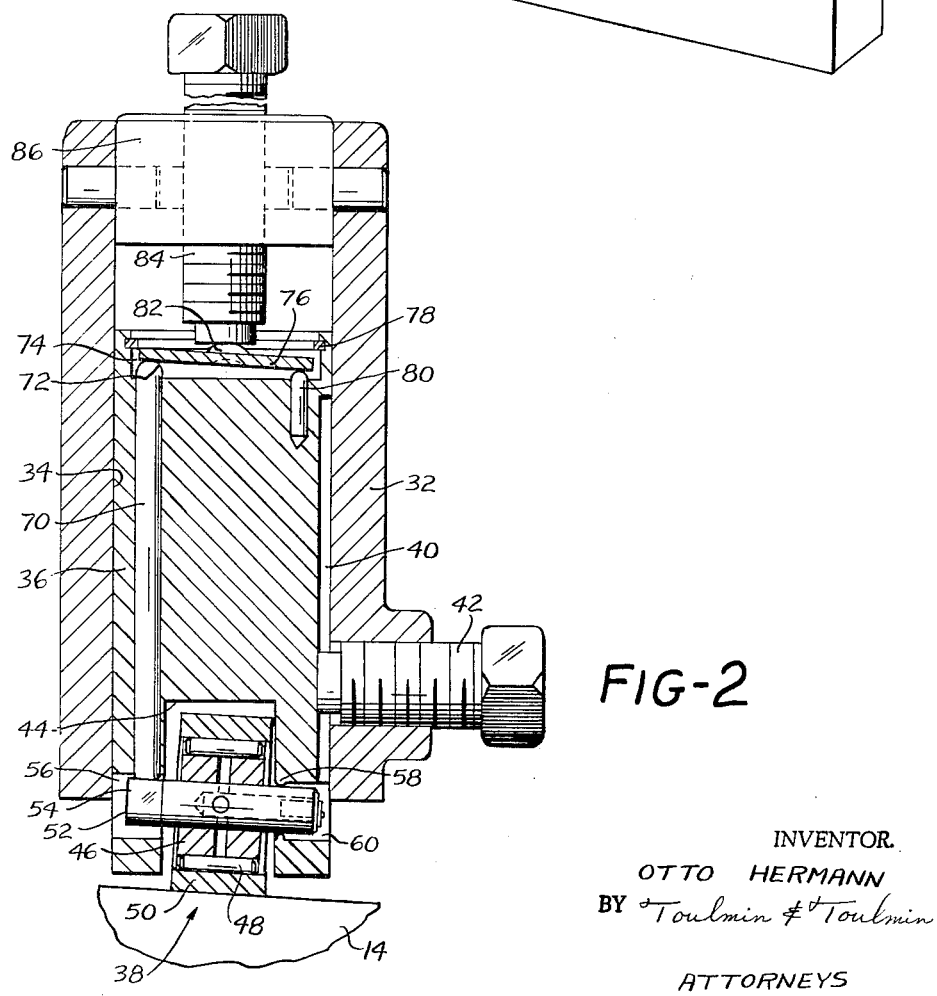

The foregoing objects of the present invention as well as still other objects and advantages thereof will become more apparent upon reference to the following specification taken in connection with the accompanying drawings in which:

FIGURE 1 is a somewhat diagramatic perspective view of a lathe embodying a steady rest having rollers therein in accordance with the present invention; and FIGURE 2 is a sectional view indicated by line 2—2 on FIGURE 1 and showing a section and in detail the construction of one of the rollers and supporting jaw therefor.

Referring to the drawings somewhat in detail, in FIGURE 1 is shown a lathe 10 having a head stock 12 with spindle 13 adapted for receiving and rotating a work piece 14 that is to be turned by a tool in carriage 16. The lathe may include a tailstock 18 supporting the end of the work piece opposite the spindle 13 that is rotatable in the headstock and which engages and supports the headstock end of the work piece.

For supporting the work piece against deflection or vibration, or both, the bed of the lathe carries a steady rest frame 22 which has a base portion 24 secured to the lathe bed and an upper portion 26 which pivoted to the base portion 24 is by pivot pin means 28, preferably positioned toward the back of the lathe, while toward the front of the lathe the threaded clamp means 30 is provided for releasably clamping the two parts of the steady rest together around a work piece.

FIGURE 2 shows in detail the construction of a steady rest roller and the supporting jaw therefor, according to the present invention. In FIGURE 2 the base portion of the steady rest frame has a part 32 with a cylindrical bore 34 therein in which is slidably mounted a cylindrical block or plunger means 36 forming the supporting jaw for the steady rest roller indicated at 38. Jaw 36 is movably retained in bore 34 and has a groove 40 down one side thereof engaged by the end portion of a set screw 42 so that the jaw can be clamped in position in bore 34, if desired, while always being held against rotation thereon.

At the roller end of jaw 36 it is provided with a notch 44 in which roller 38 is disposed with freedom of lateral movement. This roller comprises an inner part 46 forming an inner race for the anti-friction needle rollers 48 which, in turn, support the outer race on part 50 of the steady rest roller and which is the part that directly engages the work piece 14.

The inner part 46 of the steady rest roller is pressed on a shaft 52 having one end flatted as at 54 and engaging a correspondingly shaped slot 56 in the side of jaw 36. This slot permits vertical movement of the flatted end 54 of shaft 52 in the jaw. The other end of shaft 52 is pivotally supported in the jaw by means of the rib means 58 formed about the periphery of the bore 60 which is somewhat larger than shaft 52 whereby the shaft can tilt in the bore without being obstructed thereby.

The described arrangement of the roller and shaft will obviously permit tilting movement of the shaft in the roller jaw thus to permit tilting of the plane of the roller relative to the longitudinal axis of jaw 36. The roller jaw thus supports the roller in such a manner that the roller can accommodate itself to tapers in the surface of the work piece engaged thereby and the roller will bear across its complete periphery against the work piece and this will uniformly load the bearings of the roller so that rapid deterioration thereof does not take place and so that the workpiece roller wears uniformly from side to side.

The self-adjustment of the roller to the contour of the work piece engaged thereby is accomplished by engaging the flatted end 54 of the shaft 52 by a first equalizing rod or pin 70 extending slidably through jaw 36 in the direction of the length thereof and having its lower end engaging the shaft and having its upper end rounded as at 72 and extending into a recess 74 formed in the upper end of jaw 36. Within this recess is mounted an equalizing disk or plate 76, preferably a spring plate, that is retained in place loosely within the recess by snap ring 78. At a point diametrically opposite pin 70, the disk also engages a shorter equalizing pin or abutment 80 stationarily mounted in jaw 36 and also having a rounded end extending into recess 74.

Equalizing disk 76 has a central protrusion 82 engaged by the lower end of the adjustment screw 84 threaded into a block 86 that is pinned into the outer end of the cylindrical bore 34 of the steady rest structure.

In operation, the work piece to be supported is mounted in the lathe and the steady rest is then closed about the work piece and thereafter the individual jaws are adjusted inwardly into engagement with the surface of the work piece.

The equalizing arrangement for each jaw carrying a roller will permit the roller therein to engage the workpiece across the entire width of the roller and this may involve some small tilting of the roller shaft 52 and the equalizing disk 76. The equalizing disk is pressed downwardly by screw 84 but this does not prevent tilting of the equalizing disk and the shaft 52 in order to adapt the roller to the workpiece surface. As much or as little pressure as desired can be exerted on the workpiece by availing of screw 84 and the roller jaw and roller can be held in adjusted position, if desired, by tightening screw 42. Normally, screw 42 will be drawn up to the point that imposes some drag on movement of jaw 36 and 34 and the holding of the jaw and roller in position is accomplished entirely by screw 84.

The roller and its supporting jaw according to the present invention are so constructed and combined as to form a unitary assembly that can be inserted in any conventional steady or follow rest frame.

A particular advantage of the roller and jaw arrangement of the present invention, in addition to being receivable in any conventional steady rest structure is that the mounting and supporting of the steady rest frame is far less critical than has been the case heretofore. Whereas formerly it was necessary to scrape in the base of the steady rest to engage the ways of the lathe bed with precision, this is not necessary with the roller and jaw construction of the present invention because the rollers adapt themselves to not only variations in the contour of the workpiece itself but also adapt themselves to slight misalignment of the steady rest frame as well. The advantage is thus obtained that the workpiece is firmly supportingly engaged whether the workpiece is slightly tapered or whether the steady rest frame is disposed at a slight angle or whether both of these conditions are had at one and the same time.

With reference to FIGURE 2, it is to be understood that the degree of taper indicated on the workpiece is greatly exaggerated and that, in practice, the amount of taper encountered would be only a slight amount so that the roller would normally tilt only a small amount. With workpieces that might be deliberately tapered, the amount of taper could amount to as much as a few degrees included angle between the sides of the workpiece and the roller would accommodate its position to the taper.

It is to be understood in the foregoing description and in the appended claims that the term "steady rest" is intended also to include follow rests. A steady rest is ordinarily stationary in the machine while a follow rest is usually mounted on the carriage so as to travel with the working tool and engage the workpiece in the same general region that it is engaged by the working tool. It will thus be understood that the term "steady rest" as used in the claims is not intended to limit the present invention.

It will be understood that this invention is susceptible to modification in order to adapt it to different usages and conditions; and accordingly, it is desired to comprehend such modifications within this invention as may fall within the scope of the appended claims.

I claim:
1. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, and means engageable with opposite ends of said shaft for tilting said shaft in said plane so the roller will conform to taper of the workpiece.

2. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, means on each plunger means tiltably supporting one end of the pertaining shaft, and means on the plunger means movably supporting the other end of said shaft for movement thereof in said plane so the roller thereon will conform to taper of the workpiece.

3. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, means on each plunger means tiltably supporting one end of the pertaining shaft, a rod slidable axially in each plunger means and engaging the other end of the pertaining shaft, said rod extending from the outer end of its plunger means at one side, an abutment on each plunger means at the other side, and a plate for each plunger means engaging the end of said rod and said abutment.

4. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, means on each plunger means tiltably supporting one end of the pertaining shaft, a rod slidable axially in each plunger means and engaging the other end of the pertaining shaft, said rod extending from the outer end of its plunger means at one side, an abutment on each plunger means at the other side, a spring plate for each plunger means engaging the end of said rod and said abutment, and an abutment screw pivotally engaging each said plate in about the middle thereof on the side thereof opposite said plunger means.

5. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, means on each plunger means tiltably supporting one end of the pertaining shaft, a rod slidable axially in each plunger means and engaging the other end of the pertaining shaft, said rod extending from the outer end of its plunger means at one side, an abutment on each plunger means at the other side, a spring plate for each plunger means engaging the end of said rod and said abutment, and an abutment screw pivotally engaging each said plate in about the middle thereof on the side thereof opposite said plunger means, each plunger means being slidable axially in said frame and each said abutment screw being threaded into said frame.

6. A steady rest comprising; a frame adapted for being closed about a workpiece to be supported, a plurality of radial plunger means in distributed relation in the frame, each plunger means being radially adjustable toward and away from the axis of the workpiece, a shaft on the inner end of each plunger means having its axis in the plane of the axis of the workpiece and substantially parallel thereto, a roller on the shaft, means on each plunger means tiltably supporting one end of the pertaining shaft, a rod slidable axially in each plunger means and engaging the other end of the pertaining shaft, said rod extending from the outer end of its plunger means at one side, an abutment on each plunger means at the other side, a spring plate for each plunger means engaging the end of said rod and said abutment, and an abutment screw pivotally engaging each said plate in about the middle thereof on the side thereof opposite said plunger means, each plunger means being slidable axially in said frame and each said abutment screw being threaded into said frame, and means in the frame engaging the plunger means and preventing rotation of the plunger means in the frame.

7. A jaw structure for a steady rest comprising; a jaw block adapted for being slidably nonrotatably mounted in a steady rest frame, a shaft tiltable in one end of the jaw block in the plane of the axis of the jaw block, a roller on the shaft, means in the jaw block tiltably engaging one end of the shaft, an equalizing pin axially slidable in the block and engaging the other end of the shaft and projecting from the other end of the block at one side, an abutment pin in said other end of the block diametrically opposite the projecting end of said pin, and an equalizing disc engaging the end of said pin and said abutment, said block having a recess in said other end in which said disc is mounted, and means retaining the disc loosely in said recess.

8. A steady rest comprising; a frame adapted for being closed about a workpiece to be supported, a plurality of workpiece supports attached to said frame, at least one of said supports including radial plunger means, said plunger means being radially adjustable toward or away from the axis of the workpiece, a shaft on the inner end of said plunger means having its axis in the plane of the axis of the workpiece and substantially parallel thereto, a roller on the shaft, means on said plunger means tiltably supporting one end of the shaft, and means on said plunger means movably supporting the other end of said shaft for movement thereof in said plane so that the roller thereon will conform to taper of the workpiece.

References Cited by the Examiner
UNITED STATES PATENTS

| | | | |
|---|---|---|---|
| 429,880 | 6/1890 | Bogert | 82—39 |
| 1,059,225 | 4/1913 | Sherrill | 82—39 |
| 1,368,252 | 2/1921 | Flanders | 82—38 |
| 2,142,035 | 12/1938 | Peaslee | 82—38 X |
| 2,547,529 | 4/1951 | Lichtenberg | 82—39 |

WILLIAM W. DYER, JR., *Primary Examiner.*